US011516579B2

(12) United States Patent
Feng et al.

(10) Patent No.: US 11,516,579 B2
(45) Date of Patent: Nov. 29, 2022

(54) ECHO CANCELLATION IN ONLINE CONFERENCE SYSTEMS

(71) Applicant: INTERNATIONAL BUSINESS MACHINES CORPORATION, Armonk, NY (US)

(72) Inventors: Kai Feng, Beijing (CN); Yun Juan Yang, Beijing (CN); Xiao Zhen Zhu, Beijing (CN); Ming Dong, Beijing (CN); Yang Cao, Beijing (CN); Jing Hua Jiang, Beijing (CN); Yan Hui Wang, Beijing (CN); Jia Lei Rui, Liyang (CN); Qi Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/301,677

(22) Filed: Apr. 12, 2021

(65) Prior Publication Data
US 2022/0329934 A1    Oct. 13, 2022

(51) Int. Cl.
*H04R 1/40*    (2006.01)
*G10L 25/18*    (2013.01)
(Continued)

(52) U.S. Cl.
CPC .............. *H04R 1/403* (2013.01); *G10L 25/18* (2013.01); *G10L 25/51* (2013.01); *H04R 3/12* (2013.01); *H04R 29/002* (2013.01)

(58) Field of Classification Search
CPC ......... H04R 29/002; H04R 3/12; H04R 1/403
(Continued)

(56) References Cited

U.S. PATENT DOCUMENTS 9,509,852 B2    11/2016  Thapa
10,079,866 B2    9/2018  Fang
(Continued)

FOREIGN PATENT DOCUMENTS

CN    206977582 U    2/2018
EP    1745637 B1    9/2008

OTHER PUBLICATIONS

Disclosed Anonymously, "Method and System for Enabling Dynamic Audio Adjustment for Co-located Web Conferences," IP.com, IP.com No. IPCOM000258064D. IP.com Publication Date: Apr. 4, 2019, 4 pages.

(Continued)

*Primary Examiner* — Disler Paul
(74) *Attorney, Agent, or Firm* — Robert R. Aragona

(57) ABSTRACT

An embodiment for cancelling echo in online conference systems is provided. According to some embodiments of the present disclosure, the computer-implemented method comprises, in response to an update of devices of participants in an online conference, dividing, by one or more processors, the devices in an online conference into a plurality of groups, wherein the devices located in a same physical location are divided into a same group. The method also comprises, in response to an update of the devices in an online conference, selecting at least one speaker of the devices in each of the plurality of groups as a representative speaker for each of the plurality of groups. The method further comprises forwarding audio data received from microphones of the devices in one of the plurality of groups to the respective representative speaker of other groups of the plurality of groups.

17 Claims, 12 Drawing Sheets

(51) Int. Cl.
*H04R 29/00* (2006.01)
*H04R 3/12* (2006.01)
*G10L 25/51* (2013.01)

(58) Field of Classification Search
USPC ............... 381/58–59, 77, 80–81, 83, 85, 93
See application file for complete search history.

(56) References Cited

U.S. PATENT DOCUMENTS

| | | | |
|---|---|---|---|
| 11,425,261 B1* | 8/2022 | Chen | H04B 3/23 |
| 2021/0144021 A1* | 5/2021 | Casas | G06F 3/165 |
| 2021/0306742 A1* | 9/2021 | Saito | H04R 3/12 |

OTHER PUBLICATIONS

Disclosed Anonymously, "Method for detecting co-located devices in a distributed audio system," IP.com, IP.com No. IPCOM000255341D, IP.com Publication Date: Sep. 18, 2018, 3 pages.
Disclosed Anonymously, "Method of eliminating echo of web meeting," IP.com, IP.com No. IPCOM000261689D, IP.com Publication Date: Mar. 27, 2020, 5 pages.
Disclosed Anonymously, "System and method for echo suppression in web conference," IP.com, IP.com No. IPCOM000262743D, IP.com Publication Date: Jun. 25, 2020, 2 pages.
Mell et al., "The NIST Definition of Cloud Computing", National Institute of Standards and Technology, Special Publication 800-145, Sep. 2011, 7 pages.

* cited by examiner

ECHO CANCELLATION IN ONLINE CONFERENCE SYSTEMS

BACKGROUND

The present invention relates to computer techniques and more particularly, to a method, system, and computer program product for cancelling an echo in online conference systems.

Nowadays online conference systems are widely used in people's daily work. In the online conference systems, audio data may be conveyed between participants devices. During the online conference, an echo effect may occur, especially when participants of the conference are within close proximity to one another.

SUMMARY

Embodiments of the present disclosure disclose computer-implemented methods, systems and computer program products. According to some embodiments of the present disclosure, the computer-implemented method comprises, in response to an update of devices of participants in an online conference, dividing, by one or more processors, the devices in an online conference into a plurality of groups, wherein the devices located in a same physical location are divided into a same group. The computer-implemented method also comprises, in response to an update of the devices in an online conference, selecting, by one or more processors, at least one speaker of the devices in each of the plurality of groups as a representative speaker for each of the plurality of groups. The computer-implemented method further comprises forwarding, by one or more processors, audio data received from microphones of the devices in one of the plurality of groups to the respective representative speaker of other groups of the plurality of groups.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
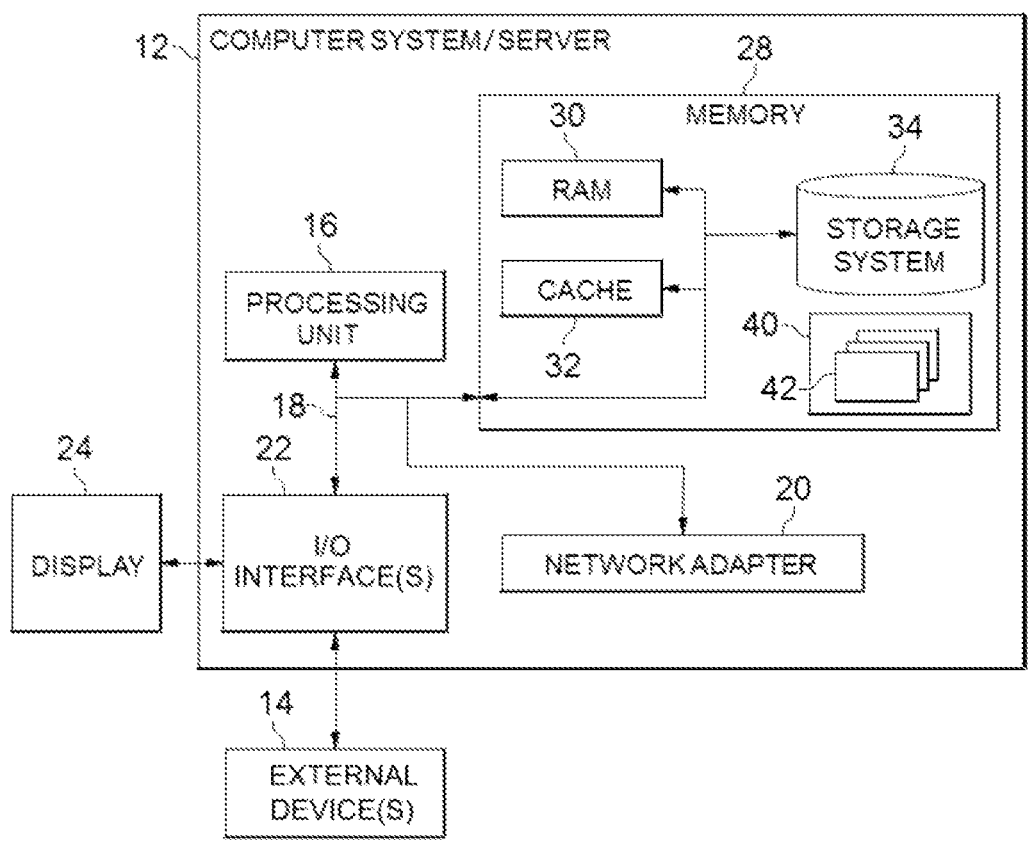
FIG. 1 depicts a cloud computing node according to some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly level out and rapidly released to quickly level in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to some embodiments of the present disclosure. Cloud computing node 10 (FIG. 2) is only one example of a suitable cloud computing node and is not intended to suggest any limitation as to the scope of use or functionality of embodiments of the disclosure described herein. Regardless, cloud computing node 10 (FIG. 2) is capable of implementing and/or performing any of the functionality set forth herein.

In cloud computing node 10 there is a computer system/server 12, which can be a portable electronic device such as a communication device, and/or numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 (FIG. 2) is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor bus or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product 40 having a set (e.g., at least one) of program modules 42 that are configured to carry out the functions of embodiments of the disclosure.

Program product 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, and a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
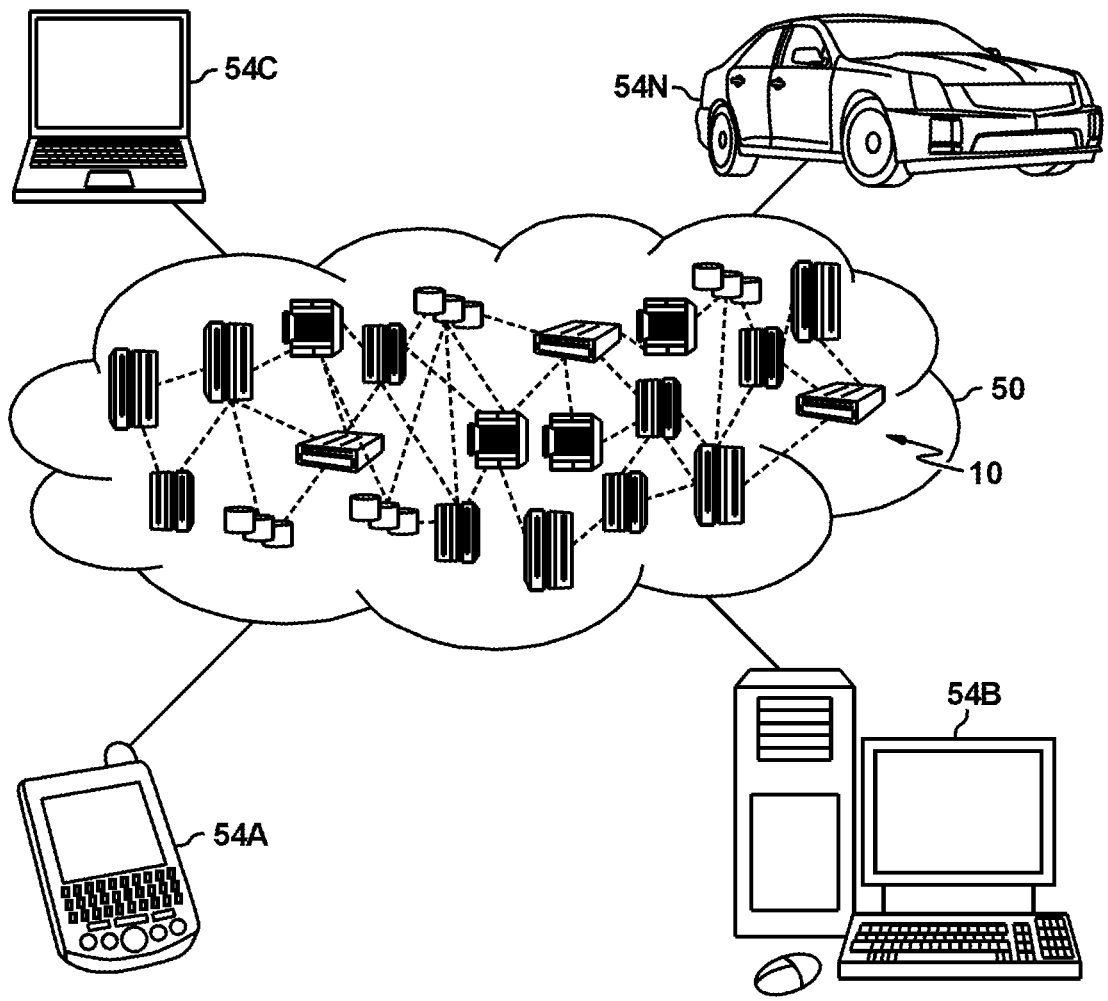
FIG. 2 depicts a cloud computing environment according to some embodiments of the present disclosure.

Referring now to FIG. 2, illustrative cloud computing environment 50 is depicted, according to some embodiments of the present disclosure. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
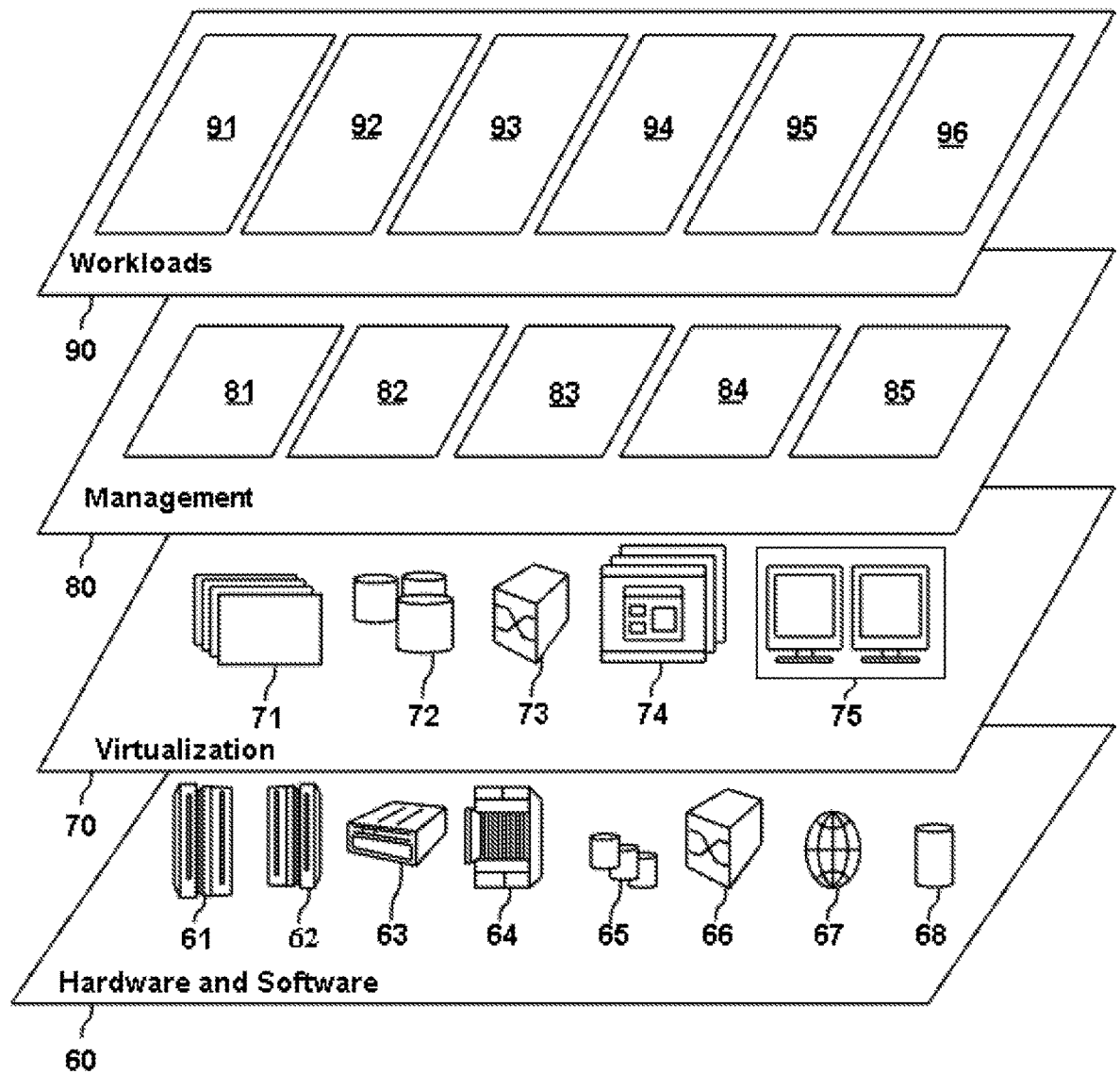
FIG. 3 depicts abstraction model layers according to some embodiments of the present disclosure.

Referring now to FIG. 3, a set of functional abstraction layers provided by cloud computing environment 50 (FIG. 2) is shown, according to some embodiments of the present disclosure. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and echo cancellation 96. The functionalities of echo cancellation 96 will be described in the following embodiments of the present invention.

As mentioned above, during the online conference, an echo effect may occur, especially when participants of the conference are within close proximity to one another. In the following, two example scenarios in which the echo effect may occur are shown in combination with FIG. 4A and FIG. 4B.

Figure 4A:
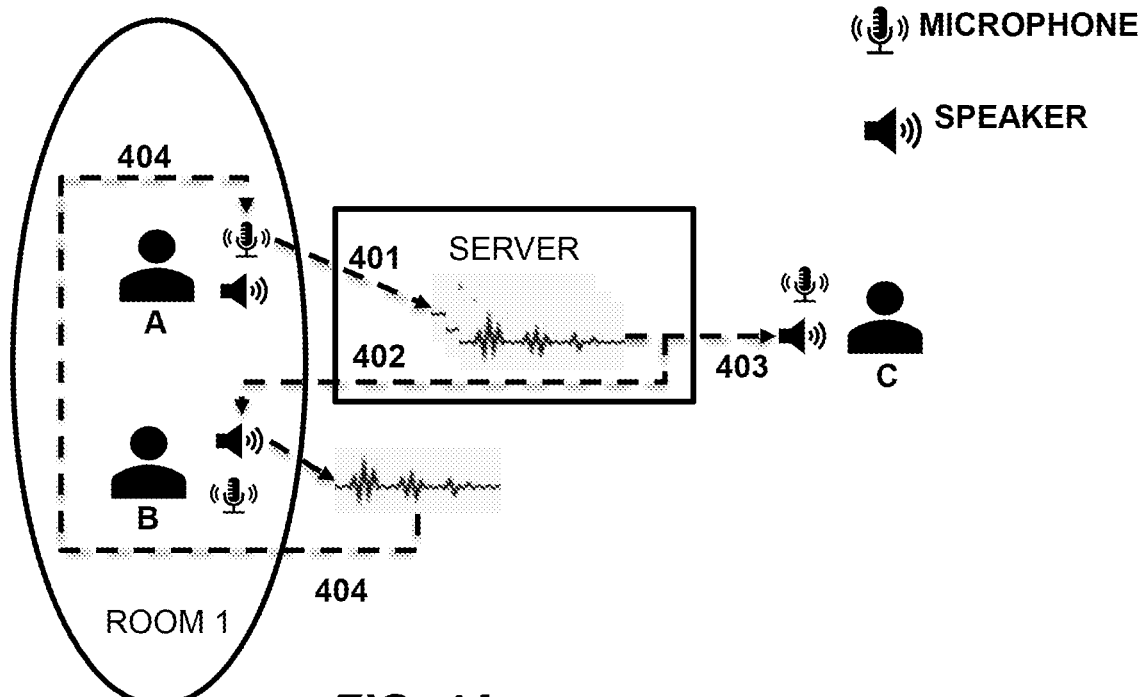
FIG. 4A depicts an example scenario in which an echo effect may occur.

With reference now to FIG. 4A, an example scenario in which the echo effect may occur is depicted. As illustrated in FIG. 4A, participants A and B are in the same physical conference room, and participant C is in another conference room. If participant A speaks, the microphone of the device used by the participant A may capture audio data of the sound of the participant A and send it to a server, as shown by dotted line 401. Herein the device used by the participant A may also be referred to as the participant device A or the device A, the device used by the participant B may be referred to as the participant device B or the device B, and so on. The conference server may forward the received audio data out to all the other devices in the conference system. One destination for the audio data may be the device B, as shown by dotted line 402 and the other destination may be the device C, as shown by dotted line 403. After the audio data is forwarded to the device B, the speaker of the device B may broadcast the sound. Because the participants A and B are in the same conference room, the participant A may speak and the speaker of the device B may play the sound of the participant A once again. Thus, the echo effect may occur. Moreover, the sound broadcasted by the speaker of device B may be captured by the microphone of participant A and sent to the server again, as shown by dotted line 404, and the server may forward the sound out again, so the echoes may be back and forth indefinitely.

Figure 4B:
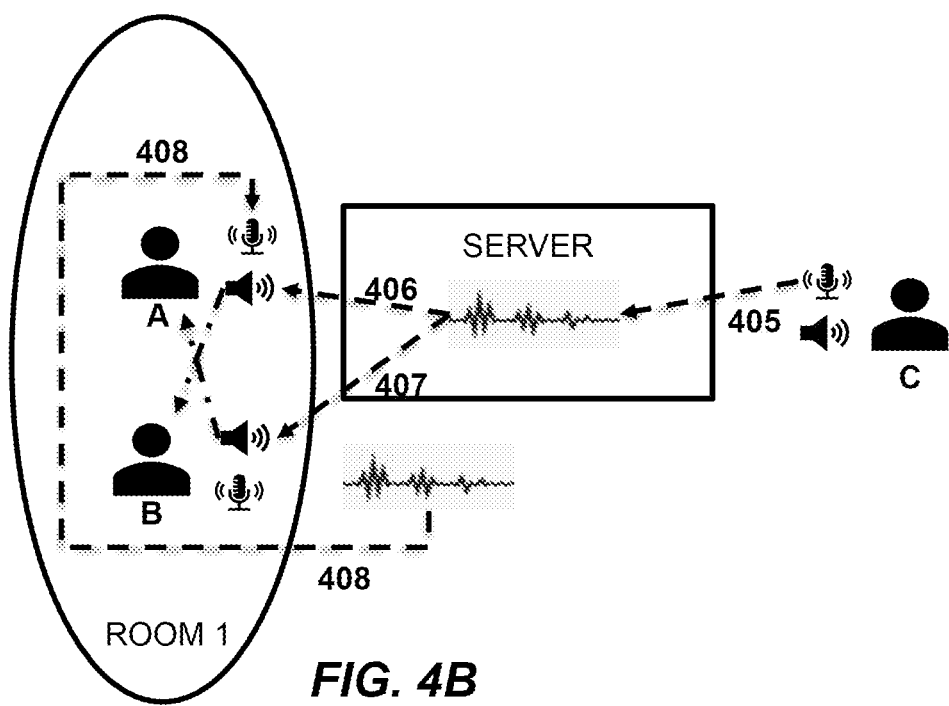
FIG. 4B depicts another example scenario in which an echo effect may occur.

With reference now to FIG. 4B, another example scenario in which the echo effect may occur is depicted. As illustrated in FIG. 4B, the participants A and B are in the same physical conference room, and the participant C is in another conference room. If the participant C speaks, the microphone of the device C may capture audio data of the sound of the participant C and send it to the server, as shown by dotted line 405. The conference server may forward the received audio data out to other devices in the conference system. One destination for the audio data may be the device A, as shown by dotted line 406 and the other destination may be the device B, as shown by dotted line 407. After the audio data is forwarded to the devices A and B, the speakers of both device A and device B may broadcast the sound. Because the participants A and B are in the same conference room, the duplication of the sound may occur, which may be similar to the echo effect described above, here collectively referred to as the echo effect. Moreover, the sound broadcasted by the speaker of device B may be captured by the microphone of participant A and sent to the server again, as shown by dotted line 408. The sound broadcasted by the speaker of device A may be captured by the microphone of participant B and sent to the server again, which is not shown. The server may forward the received sound out again, so the echoes may be back and forth indefinitely.

In view of the above two scenarios, the existing solution to avoid the echo effect in online conference systems is when one pair of microphone and speaker is enabled, other microphones and speakers of the devices are disabled in the same conference room. The participants in the same conference room may need to coordinate to determine who may enable the microphone and speaker of the device. Under this situation, if the participant who has disabled the microphone wants to speak, the participant may need to manually enable the microphone of his/her own or the participant may need to get close to another device which is enabled. However, the enabled speaker may not be optimal or suitable, so the participant who has disabled the speaker may not be able to hear clearly. It may therefore be desirable to cancel the echo automatically without disabling the microphones and/or speakers during the course of the online conference.

According to example embodiments of the present invention, there is proposed a solution for automatic echo cancellation during the course of the online conference. In this solution, in response to an update of participants devices in an online conference, the participants devices of the conference are divided into a plurality of groups. The participants devices located in a same physical location, for example, a same conference room, are divided into a same group. And at least one speaker of participants devices is selected from each group as a representative speaker for respective group. The update may refer to a real-time update of one or more devices connecting to or exiting from the conference from the beginning to the end of the conference. Then audio data received from participants devices in one group is forwarded to the representative device of other groups, but not all the other devices. It may not be the case that what a participant in a physical conference room just said is forwarded back by the server and broadcasted out by speakers in the same physical location. At the same time, the audio data may only be forwarded to the representative devices in other group, and no duplication of the sound may be broadcasted by the speakers in the same physical location. Therefore, the echo effect may be avoided even in situations where all the speakers are enabled according to the present solution.

Figure 5:
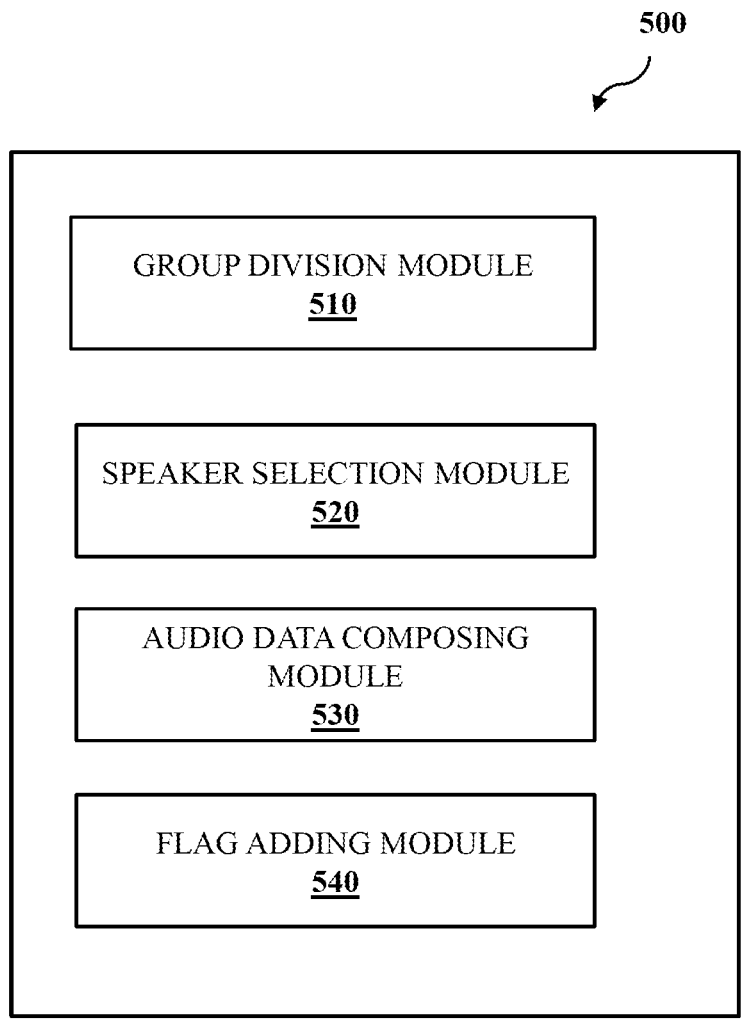
FIG. 5 depicts a schematic diagram of an example echo cancellation system according to embodiments of the present invention.

This solution may be implemented by an echo cancellation system, such as the example echo cancellation system 500 depicted in FIG. 5.

Reference is now made to FIG. 5, which depicts a schematic diagram of an example echo cancellation system according to embodiments of the present invention. The echo cancellation system 500 may be configured in a sever of an online conference application. The echo cancellation system 500 may be implemented in software, hardware, firmware, and/or any combination thereof. It should be noted that the online conference application may be a program or process to implement or provide a function of the online conference.

As illustrated in FIG. 5, the echo cancellation system 500 may include a group division module 510, a speaker selection module 520, an audio data composing module 530, and a flag adding module 540. It would be appreciated that the echo cancellation system 500 is merely provided as a specific example, and the number of modules depicted in the FIG. 5 is merely shown for the purpose of illustration and in other examples, a different number of modules may work together to provide a similar function or intention.

The group division module 510 may be configured to divide the devices in an online conference into a plurality of groups. The devices located in a same physical location may be divided into a same group. The speaker selection module 520 may be configured to select at least one speaker of a device from each group as a representative speaker for the respective groups. According to some embodiments of the present invention, the audio data may be forwarded from the devices in one group to the representative speakers of the other groups. Further, the audio data composing module 530 may be configured to identify the spectrum for the audio data from one group, compose the audio data without the repetitive spectrum as output audio data, and forward the output audio data to the representative speaker of the other groups. Further, the flag adding module 540 may be configured to add a flag to original received audio data and forward the audio data with the flag to the representative speaker of the other groups. The above modules will be discussed in detail in the following in combination with FIGS. 6-10.

According to embodiments of the present invention, the group division module 510 may be configured to divide the devices in an online conference into a plurality of groups. One or more devices in the conference system in a same physical location may be divided into a same group. According to some embodiments of the invention, the group division module 510 may identify which devices are in the same physical location based on an analysis of the devices.

Figure 6A:
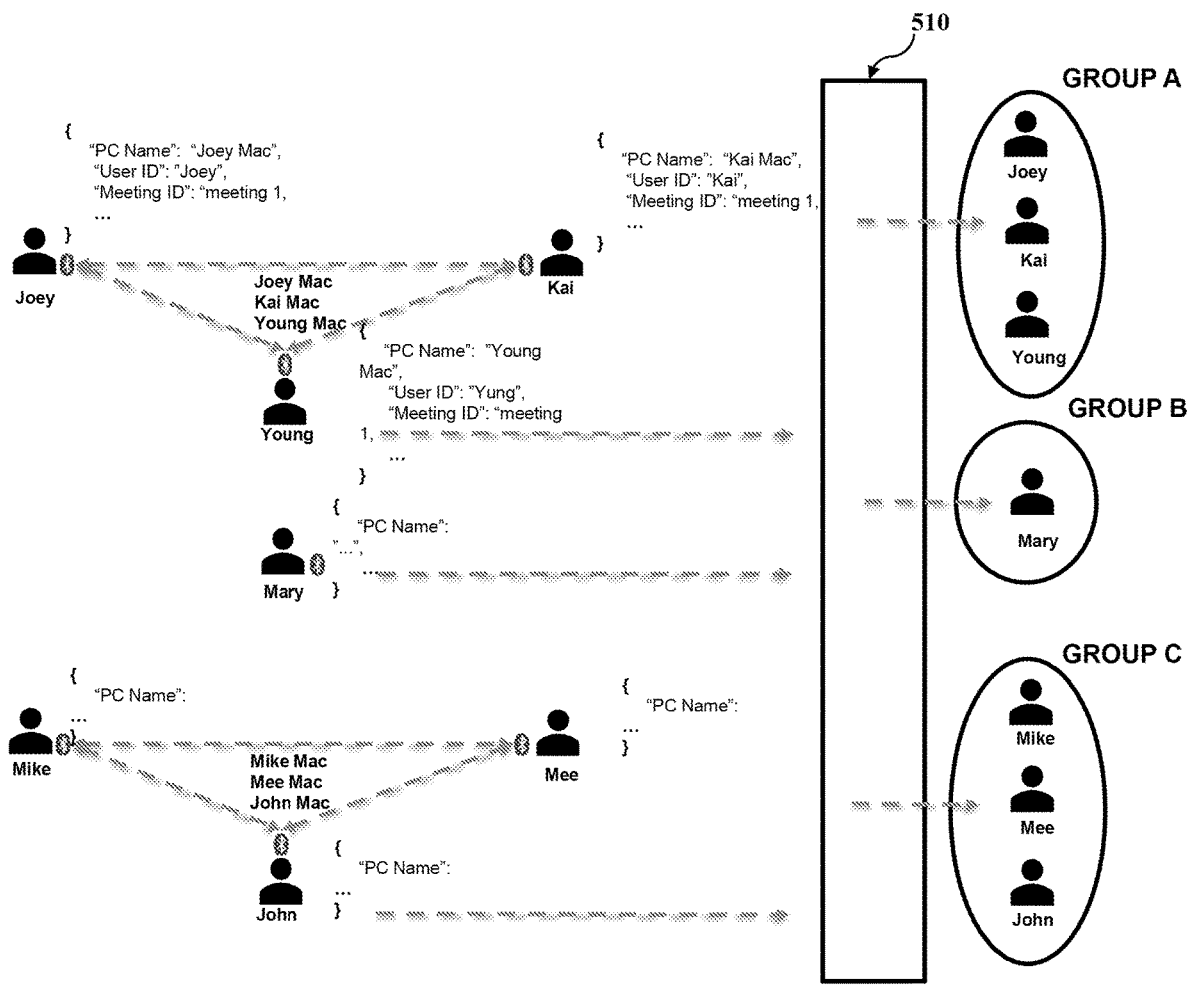
FIG. 6A depicts a schematic diagram of group division based on information of the devices of participants according to embodiments of the present invention.

Reference is now made to FIG. 6A, which depicts a schematic diagram of group division based on information of the devices according to embodiments of the present invention. The group division module 510 may obtain login information from the devices in an online conference, including but not limiting to: device or PC name, meeting ID, and so on. The group division module 510 may also obtain information regarding "neighbors" of the device detected by, for example, Bluetooth of the device. For example, the information obtained from participants Joey, Kai and Young may be as follows, respectively.
The information from Joey may be as below:
{"PC Name": "Joey macbook";
"Usesr ID": "Joey";
"Meeting ID": "meeting 1";
"Neighbours": ["Kai macbook", "Young macbook"]}.
The information from Kai may be as below:
{"PC Name": "Kai macbook";
"Usesr ID": "Kai";
"Meeting ID": "meeting 1",
"Neighbours": ["Joey macbook", "Young macbook"]}.
The information from Young may be as below:
{"PC Name": "Young macbook";
"Usesr ID": "Young";
"Meeting ID": "meeting 1",
"Neighbours": ["Joey macbook", "Kai macbook"]}.

As can be seen from the above information, the participants Joey, Kai and Young are neighbors to each other. So the group division module 510 may determine that the participants Joey, Kai and Young are in the same physical location and divide the participants Joey, Kai and Young into one group, referred to as Group A, as shown in FIG. 6A.

Similarly, as illustrated by FIG. 6A, the participants Mike, Mee and John are neighbors to each other. The group division module 510 may divide Mike, Mee and John into one group, referred to as Group C. For the participant Mary, no neighbor information may be obtained, thus the group division module 510 may designate Mary herself as a separate group, referred to as Group B.

Figure 6B:
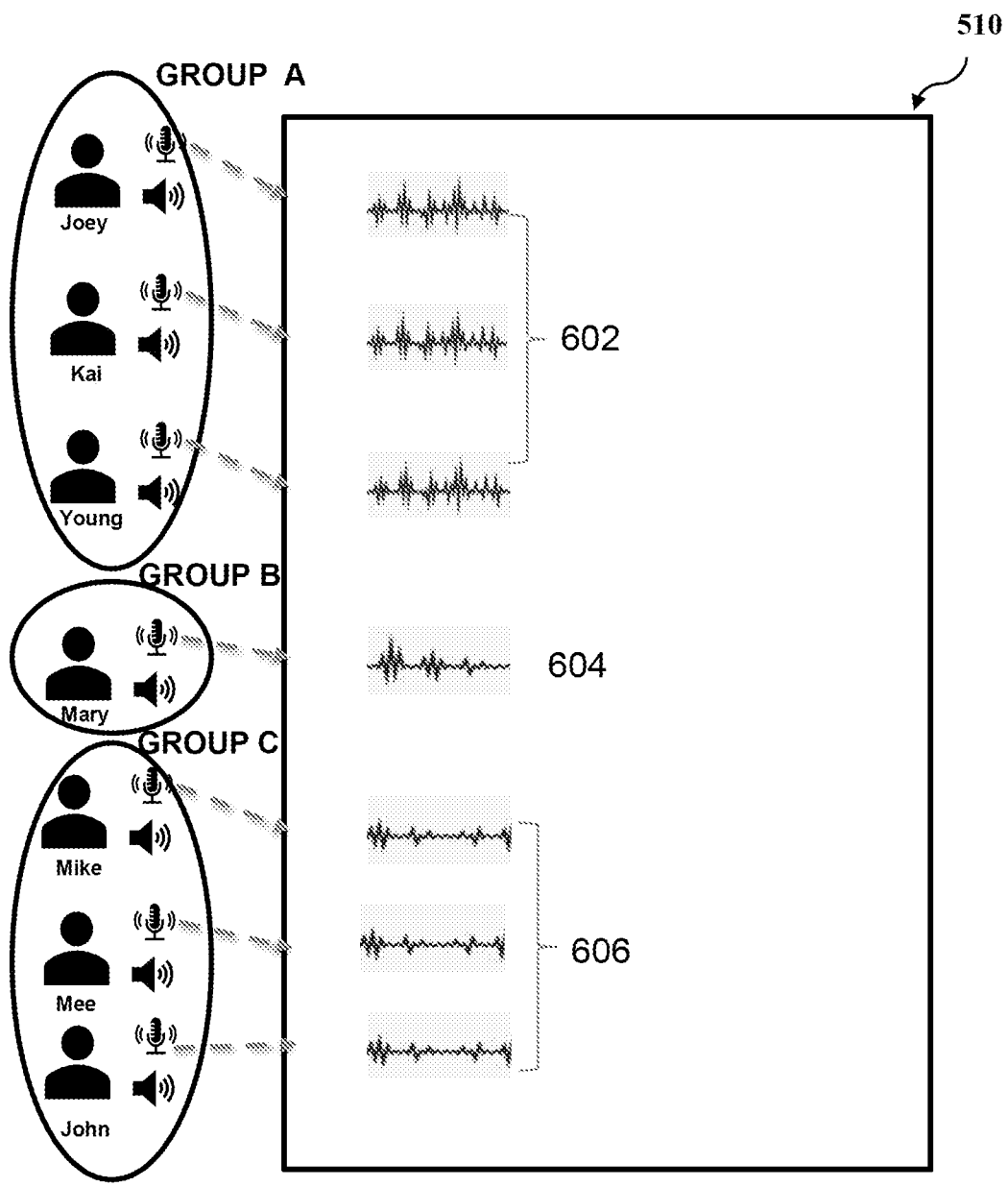
FIG. 6B depicts a schematic diagram of group division based on spectrums of the audio data of the devices of participants according to embodiments of the present invention.

Reference is now made to FIG. 6B, which depicts a schematic diagram of group division based on spectrums of the audio data of the devices according to embodiments of the present invention. The audio data may be defined as a kind of energy wave and may be measured by spectrum and intensity. It may be considered that in a same physical location, there will be a same sound source. The audio data from the same sound source may have the same spectrum. According to embodiments of the present invention, in response to receiving audio data from the devices in an online conference, the group division module 510 may obtain spectrums of the audio data from each microphone of each device. Then the group division module 510 may compare each spectrum with others to find out which ones are the same. It may be determined that the audio data with the same spectrum may come from the same source. The audio data from the same source may be located in a same physical location, so that the devices with the same spectrum may be divided into a same group. As illustrated by FIG. 6B, the audio data of participants Joey, Kai and Young have the same spectrum 602 and the group division module 510 may divide them into one group, i.e. Group A. Similarly, since the audio data of the participant Mary has a unique spectrum 604, the group division module 510 may designate Mary herself as a group individually, referred to as Group B. The audio data of the participants Mike, Mee and John have the same spectrum 606. The group division module 510 may divide Mike, Mee and John into one group, referred to as Group C.

It should be pointed out that the group division may not be limited to the above two approaches shown in FIGS. 6A and 6B respectively. The above two approaches may be executed individually or in combination. According to the embodiments of the present invention, the combination of the above two approaches will have some advantages. In particular, sometimes the participants may not turn on the Bluetooth of the device, so the information regarding neighbors of the device may not be obtained. At the same time, since Bluetooth is based on a distance detection, the Bluetooth may cover the information of participants in a neighboring room. Therefore, the groups divided based on the detected information may be inaccurate and only rough groups.

Figure 6C:
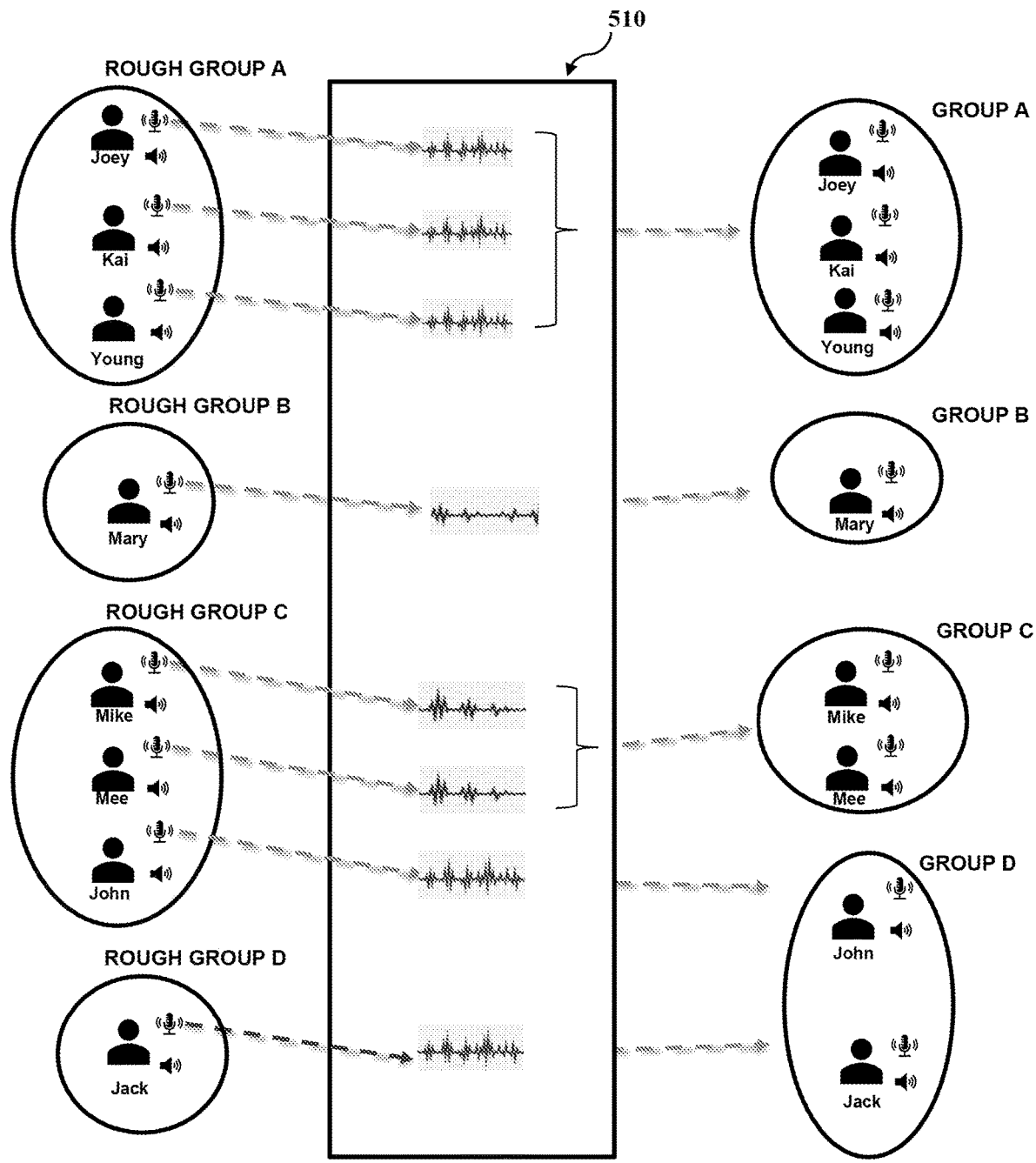
FIG. 6C depicts a schematic diagram of group division based on both information of the devices of participants and spectrums of the audio data of the devices according to embodiments of the present invention.

Reference is now made to FIG. 6C, which depicts a schematic diagram of group division based on both information of the devices and spectrums of the audio data of the devices according to embodiments of the present invention. The group division module 510 may first divide the devices into rough groups based on the detected information. Then the group division module 510 may further regroup the rough groups if necessary. The group division module 510 may first compare the spectrums of audio data of the devices within each group. If there are two or more kinds of spectrums within a group, the devices in the group may be split into two or more groups correspondingly such that each group may only comprise one or more devices with the same spectrum. For example, as illustrated in FIG. 6C, participant John in group C has a different spectrum from the other two members in the group, so John may be separated from group C. Then the group division module 510 may compare the spectrum across the groups to merge groups with the same spectrum into one group, if any. For example, as illustrated in FIG. 6C, participant John and participant Jack have the same spectrum, so they may be merged as the group D. It should be noted that, the comparison of spectrums across the groups in the approach shown in FIG. 6C may be more efficient than the comparison of spectrum individually in FIG. 6B. The approach shown in FIG. 6C may also solve the aforementioned problem that individual participants may not turn on the Bluetooth of the device and/or the one or more devices in the neighboring room may incorrectly be included.

Figure 7A:
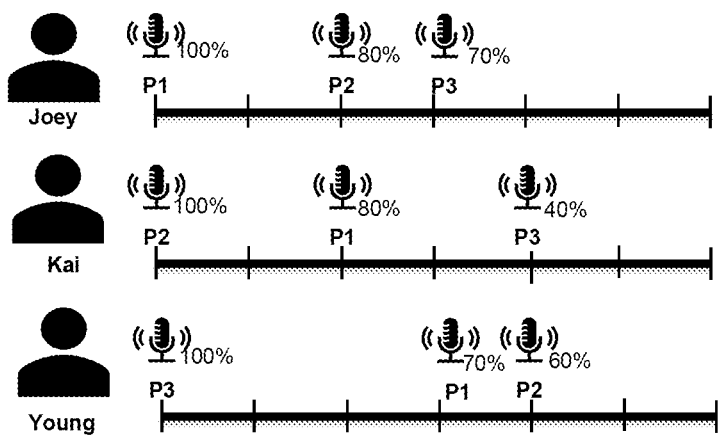
FIG. 7A depicts a schematic diagram of relative distances between participants for one group in the online conference according to embodiments of the present invention.
Figure 7B:
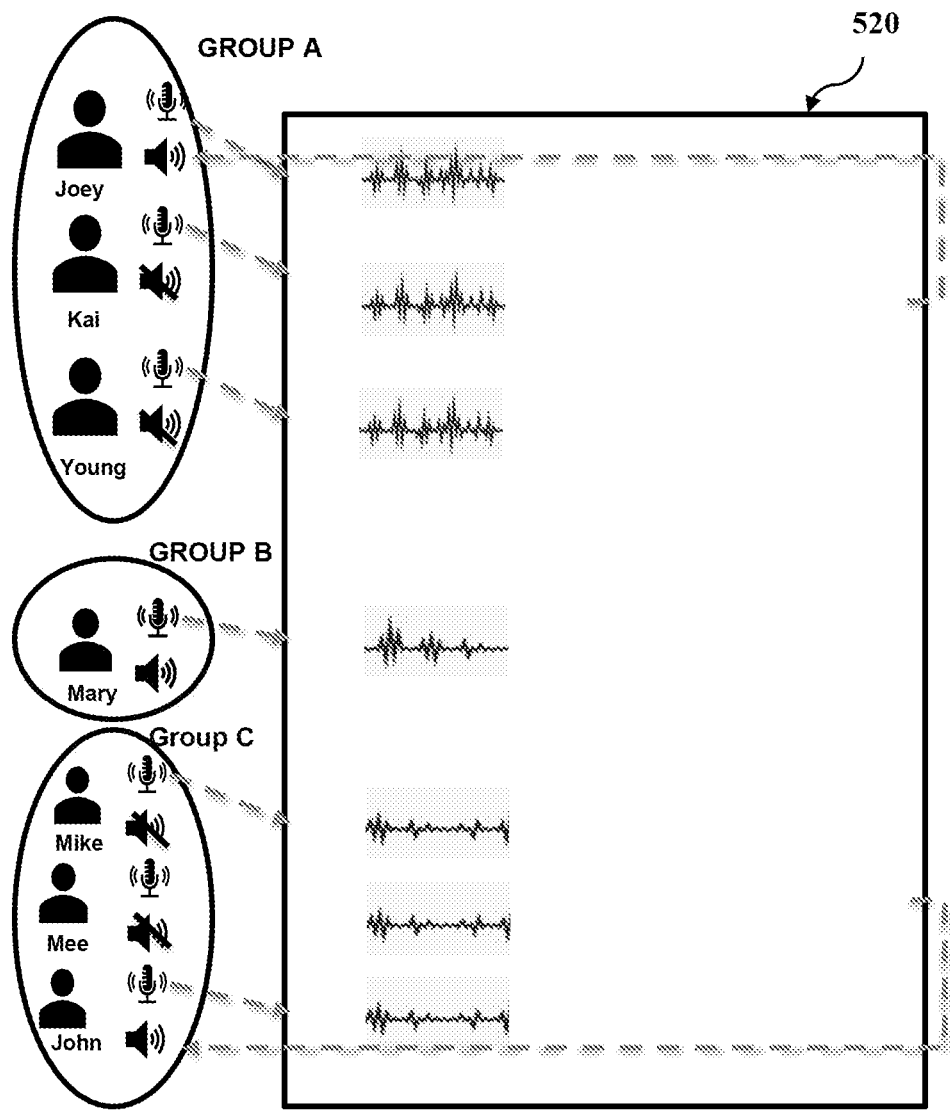
FIG. 7B depicts a schematic diagram of speaker selection according to embodiments of the present invention.

Reference is now made to FIG. 7A and FIG. 7B. FIG. 7A depicts a schematic diagram of relative distances between participants in one group in the online conference according to embodiments of the present invention. FIG. 7B depicts a schematic diagram of speaker selection according to embodiments of the present invention. According to some embodiments of the present invention, the devices located in a same physical location may be divided into a same group. For each group, the speaker selection module 520 may select at least one speaker of the device in each group as a representative speaker for the respective group. The audio data forwarding module 550 (FIG. 5) may forward the audio data from the devices in one group to the representative speaker in the other groups. In other words, the representative speaker of the group may be used to receive the forwarded audio data from any other group and broadcast the received sound/audio data within the group. It may be required to select at least one optimal speaker of the device which may make all the participants in the group able to hear the forwarded audio data more clearly. In the example shown in FIG. 7A and FIG. 7B, only one speaker is selected as a representative speaker for each group. It may be understood that for larger locations, two or more speakers may be selected, which is not limited herein.

According to some embodiments of the present invention, the sound from each participant may be captured by the microphones of all devices in a same physical location and the speaker selection module 520 may obtain the captured sound of each device. The speaker selection module 520 may estimate the relative distances between participants based on the intensity of the audio data of the captured sounds in each group. At the same time, the speaker selection module 520 may also obtain information regarding a volume percentage of the speaker of each device in the online conference. Then the speaker selection module 520 may calculate a weight for each speaker based on the volume percentage of the speaker and the sum of relative distances between one participant and any other participant. The weight is proportional to the volume percentage of the speaker and inversely proportional to the sum of the relative distances. The speaker selection module 520 may select the speaker with the largest weight as the representative speaker. For example, the weight for each speaker may be calculated by the below formula. It should be noted that the formula is only illustrative and is not intended to suggest any limitation as to the scope of embodiments of the present invention. The example formula may be:

$$W = V \Big/ \sum_{\substack{k=1 \\ k \neq m}}^{n} |P_m P_k|,$$

wherein w represents weight for each speaker, v represents the volume percentage of the speaker of each participant device, n represents number of participants, $|P_m P_k|$ represents relative distance between the participant $P_m$ to any other participant $P_k$.

As illustrated in FIG. 7A, the sound from each participant may be captured by the microphones of all the devices and the speaker selection module 520 may obtain all the captured sounds. For example, Joey (referred to as P1), Kai (referred to as P2), and Young (referred to as P3) are in the same group. When P1 speaks, the sound of P1 may be captured by the microphones of P1, P2 and P3 respectively. Continuing the example, assume that the intensity of the audio data of the captured sounds from P1, P2 and P3 is 100%, 80% and 70% respectively. Since the sound is from P1, the intensity of the audio data of the captured sounds from P1 may be the strongest, for example, 100%. P2 is farther from P1, and the amount of the intensity reduction may be, for example, 20%. P3 is the farthest from P1, and the amount of the intensity reduction may be, for example, 30%. The relative distance between P1 and P2 (referred to as |P1P2|) or P1 and P3 (referred to as |P1P3|) may be proportional to the amount of the intensity reduction of P2 or P3. For example, the amount of the intensity reduction of P2 is 20%, and |P1P2|=2. The amount of the intensity reduction of P2 is 30%, and |P1P3|=3. Assuming the volume percentage of the speaker of P1 is 90%, the weight for P1 may be calculated with above example formula as follows: w=90%/(2+3)=18%.

Similarly, assuming the weight calculated for P2 and P3 with the above example formula is 10% and 15% respectively, the speaker selection module 520 may select the speaker of P1, which is with the largest weight, as the representative speaker for the group. As illustrated in FIG. 7B, the speaker of P1 is selected as the representative speaker for Group A and the speaker of John is selected as the representative speaker for Group C. Since Mary is the only member of Group B, the speaker of Mary may be the representative speaker by default. In this manner, at least one speaker which is suitable to broadcast the audio data from the other groups on behalf of this group may be selected automatically. The speakers which are not selected may not receive the audio data from the other groups, and the participants may not need to disable them manually.

Figure 8:
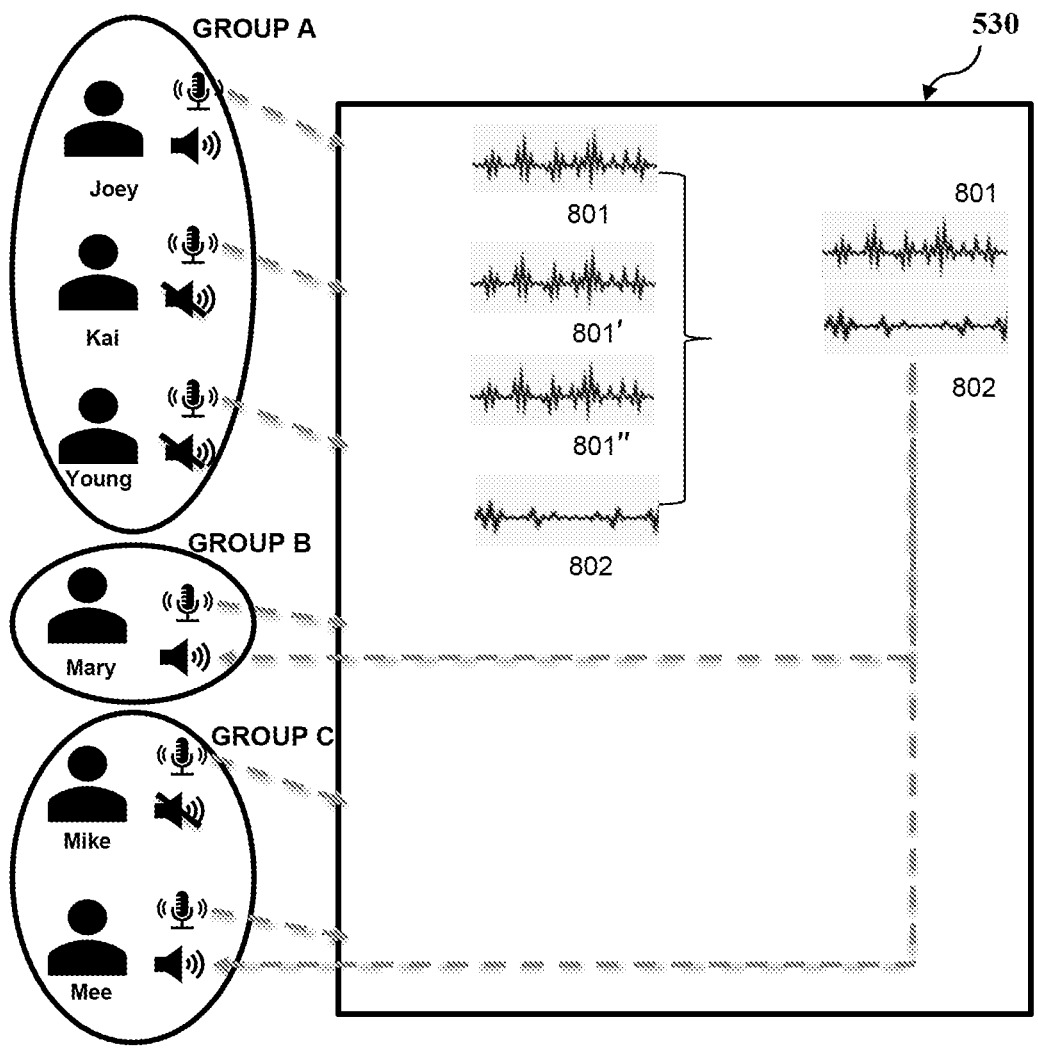
FIG. 8 depicts a schematic diagram example of composing audio data according to embodiments of the present invention.

Reference is now made to FIG. 8, which depicts a schematic diagram example of composing audio data according to embodiments of the present invention.

According to embodiments of the present invention, the microphones for all the devices may be enabled and once a participant speaks, the sound from the participant may be captured by all the microphones of the devices in the same physical location. Thus, there may be multiple audio data from a same source of sound in each group. The audio data from the same source of sound may have the same spectrum. As illustrated in FIG. 8, if the participant Joey in the Group A speaks, the audio data composing module 530 may receive the audio data from three microphones of the devices in Group A, which may have the same spectrums 801, 801' and 801" respectively. The spectrums 801' and 801" may be the repetitive spectrums of spectrum 801. At the same time, if the participant Young in Group A also speaks, the audio data composing module 530 may receive the audio data from three microphones of the devices in Group A, which may have the same spectrums 802, 802' and 802." (To simplify, 802' and 802" are not shown). Under this situation, the audio data composing module 530 may remove the audio data with repetitive spectrums, such as 801' and 801" and 802' and 802"(not shown). The audio data composing module 530 may compose the audio data without the repetitive spectrum, such as 801 and 802, as output audio data for the Group A. Then the audio data composing module 530 may forward the output audio data to the representative speakers of other groups, such as the speaker of Mary in the Group B and the speaker of Mee in the Group C. In this manner, all speech of the participants in each group can be forwarded to other groups and there may be no duplicated sound if all microphones are enabled, and the participants may not need to disable the microphones manually.

Figure 9:
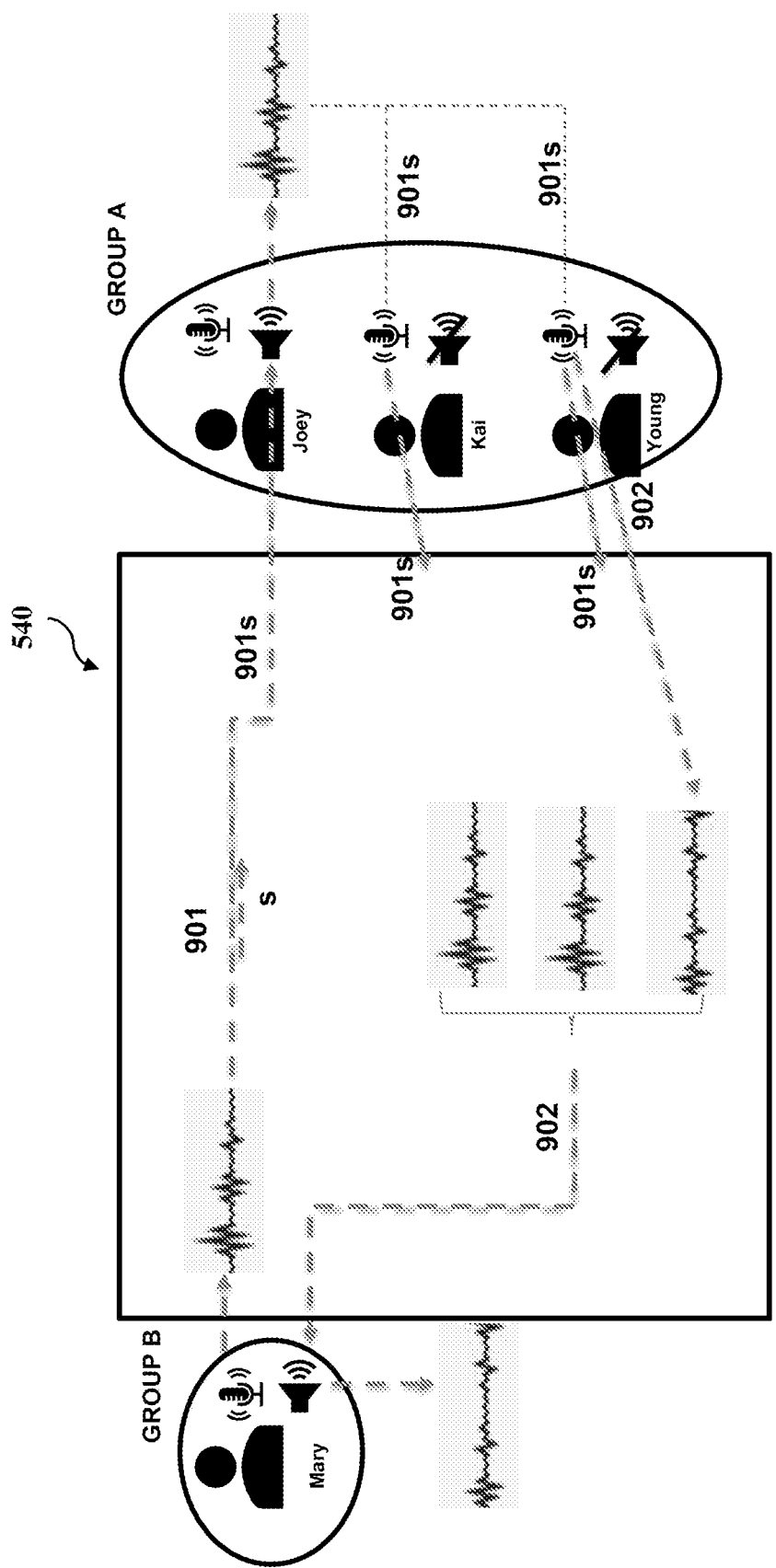
FIG. 9 depicts a schematic diagram example of adding flag to according to embodiments of the present invention.

Reference is now made to FIG. 9, which depicts a schematic diagram example of adding a flag to the audio data according to embodiments of the present invention.

As mentioned with reference to FIGS. 4A and 4B, the sound from the other groups broadcasted by the speaker of the devices may be captured by the microphones and sent back to the server again. The server may forward the received sound out to the representative speakers, even infinitely back and forth. According to embodiments of the present invention, the flag adding module 540 may add a signal of the flag to the original received audio data. Once the audio data is received, the flag adding module 540 may detect whether there is a signal of the flag together with the received audio data. If there is no signal of the flag, the flag adding module 540 may determine that the received audio data is original. Then, the flag adding module 540 may add a signal of the flag to the received audio data. If there is a signal of the flag, the flag adding module 540 may determine that the received audio data is not original, but rather is forwarded once again. Then, the flag adding module 540 may remove the received audio data. In this manner, the participants may not need to manually disable the microphones and the echo effect caused by forwarding the audio data once again may be avoided.

As illustrated in FIG. 9, if the participant Mary in Group B speaks, the flag adding module 540 may receive the audio data 901 and add a signal of flag "s" to it, which is referred as 901s. Then, the audio data 901s may be forwarded to Group A. In Group A, the speaker of Joey may broadcast the audio data 901s and the audio data 901s may be captured by the microphones of Kai and Young, respectively. The audio data 901s may be received by the flag adding module 540 once again. At the same time, Young speaks and the audio data 902 from Young may also be received by the flag adding module 540. The flag adding module 540 may detect whether there is a signal of flag "s" included in the received audio data. For example, the flag adding module 540 may find there is the signal of flag "s" included in the audio data 901s, but there is no signal in the audio data 902. The flag adding module 540 may remove the audio data 901s and only forward the audio data 902 to the Group B. It should be pointed out that the signal of flag "s" may be negligible and may not affect the sound quality.

It should also be pointed out that according to embodiments of the present invention, the approaches shown in FIG. 8 and FIG. 9 may be executed individually or in combination, which is not limited herein.

Figure 10:
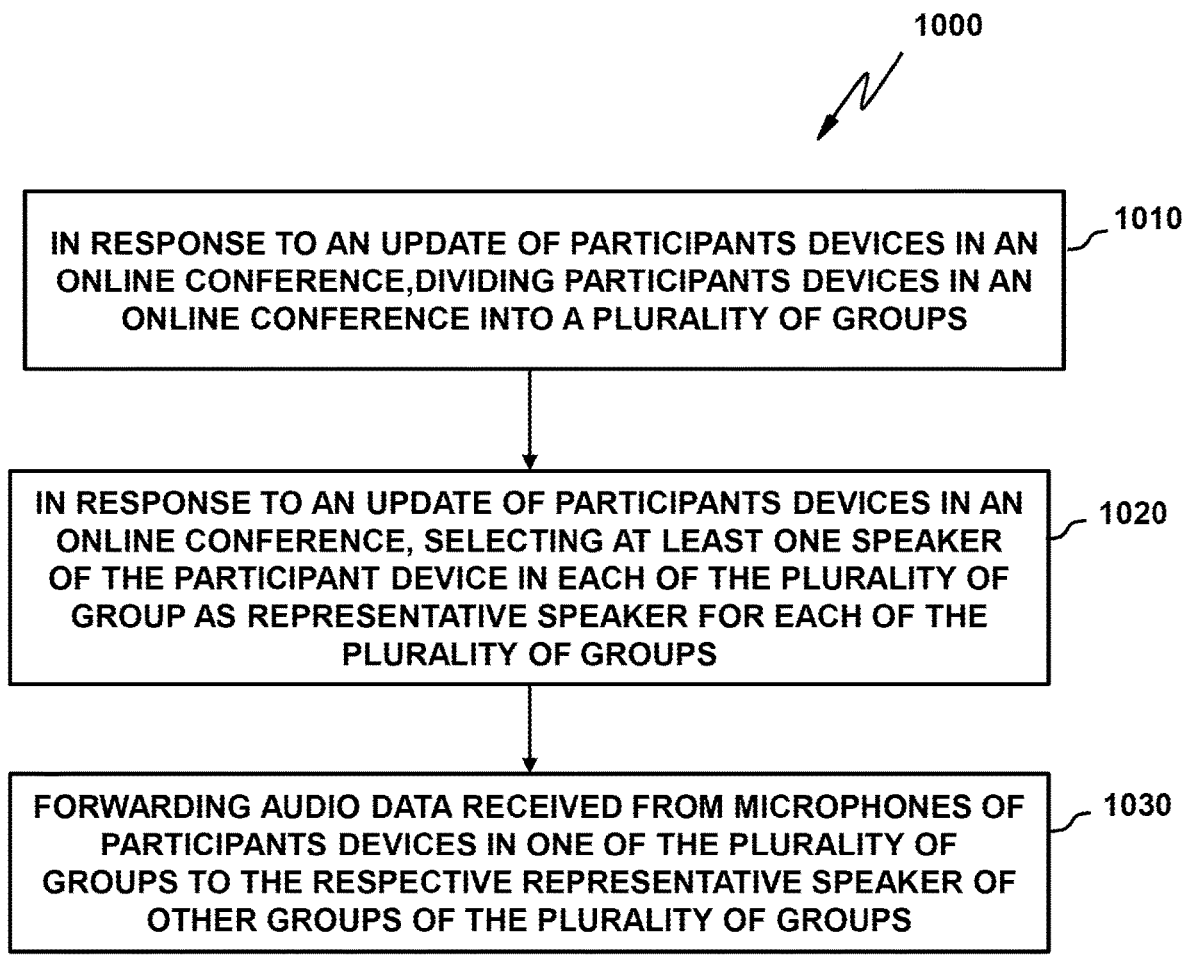
FIG. 10 depicts an example flow chart of method 1000 for cancelling an echo according to embodiments of the present invention.

Reference is now made to FIG. 10, in which an example flow chart of method 1000 for cancelling echo according to embodiments of the present invention is depicted. The method 1000 may comprise operations 1010-1030. For the purpose of discussion, the method 1000 will be described with reference to FIG. 5.

At operation 1010, in response to an update of the devices in an online conference, the group division module 510 (FIG. 5) may divide the devices in the online conference into a plurality of groups, wherein the devices located in a same physical location are divided into a same group. At operation 1020, in response to an update of the devices in the online conference, the speaker selection module 520 (FIG. 5) may select at least one speaker of the devices in each of the plurality of groups. At operation 1030, the echo cancellation system 500 may forward the audio data received from the microphones of the devices in one of the plurality of groups to the respective representative speaker of other groups of the plurality of groups.

With the operations shown in the FIG. 10, the echo effect may be cancelled without disabling the speakers of the devices in the conference room.

In some embodiments, at operation 1010, the group division module 510 (FIG. 5) may check whether there are devices which are neighbors to each other. In response to there being devices which are neighbors to each other, the group division module 510 (FIG. 5) may include the devices which are neighbors to each other into a group. In response to there being one or more devices which are not included in the group, the group division module 510 (FIG. 5) may include each of the one or more devices into an individual group. In response to receiving the audio data from each of the devices, the group division module 510 (FIG. 5) may obtain a spectrum of the audio data for each device. In response to there being two or more kinds of spectrums within a group, the group division module 510 (FIG. 5) may split the group into two or more groups correspondingly, each group having the same spectrum. In response to there being groups having the same spectrum, the group division module 510 (FIG. 5) may combine the groups into one group.

In some embodiments, at operation 1010, in response to receiving the audio data from each of the devices, the group division module 510 (FIG. 5) may obtain a spectrum of the audio data for participant device, and may include one or more devices with the same spectrum into one group.

In some embodiments, at operation 1020, the speaker selection module 520 (FIG. 5) may identify the intensity of the audio data received from the devices in each group, estimate relative distances between each participant and any other participant in each group based on the intensity, obtain a volume percentage of the speaker of each device, calculate a weight for each speaker in the group based on the volume percentage of the speaker and the relative distances, and select at least one speaker with the largest weight as a representative speaker for the respective groups.

In some embodiments, at operation 1030, the audio data composing module 530 (FIG. 5) may receive the audio data from microphones of the devices in one group and identify a spectrum of the received audio data. In response to there being audio data with repetitive spectrums, the audio data composing module 530 (FIG. 5) may remove the audio data with the repetitive spectrums, compose the audio data without repetitive spectrums as output audio data for the group, and forward the output audio data to the at least one representative speaker of the other groups.

In some embodiments, at operation 1030, the flag adding module 540 (FIG. 5) may receive the audio data from microphones of the devices in one group and detect whether there is a signal of a flag, together with the received audio data. In response to detecting there is no signal of the flag, the flag adding module 540 (FIG. 5) may add a signal of the flag to the received audio data and forward the received audio data with the signal of the flag to the at least one the representative speaker of the other groups. In response to detecting there is a signal of the flag, the flag adding module 540 (FIG. 5) may remove the received audio data.

With the operations in the further embodiments, the echo effect may be cancelled without disabling both the speakers and the microphones of the devices in a conference room.

It should be noted that the processing of the echo cancellation system according to embodiments of this invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

What is claimed is:

1. A computer-implemented method performed by one or more processors, the method comprising:

in response to an update of devices of participants in an online conference, dividing the devices in the online conference into a plurality of groups and selecting at least one speaker of the devices in each of the plurality of groups as a representative speaker for each of the plurality of groups, wherein the devices located in a same physical location are divided into a same group, wherein the selecting at least one speaker of the devices in each of the plurality of groups further comprises:

identifying an intensity of the audio data received from the devices in each group;

estimating relative distances between each participant and any other participant in each group based on the intensity;

obtaining a volume percentage of the speaker of each device;

calculating a weight for each speaker in the group based on the volume percentage of the speaker and the relative distances; and selecting at least one speaker with a largest weight as the representative speaker for respective groups; and forwarding audio data received from the devices in one of the plurality of groups to the respective representative speaker of other groups of the plurality of groups.

2. The method of claim 1, wherein the dividing of the devices in the online conference into the plurality of groups further comprises:

checking whether there are devices which are neighbors to each other;

in response to there being devices which are neighbors to each other, including the devices which are neighbors to each other into a group; and in response to there being one or more devices which are not included in the group, including each of the one or more devices into an individual group.

3. The method of claim 2, further comprising:

in response to receiving the audio data from each of the devices, obtaining a spectrum of the audio data for each device;

in response to there being two or more kinds of spectrums within a group, splitting the group into two or more groups correspondingly, each group having the same spectrum; and in response to there being groups having the same spectrum, combining the groups into one group.

4. The method of claim 1, wherein the dividing of the devices in the online conference into the plurality of groups further comprises:

in response to receiving the audio data from each of the devices, obtaining a spectrum of the audio data for each device; and including one or more devices with the same spectrum into one group.

5. The method of claim 1, wherein the forwarding of audio data received from the devices in one of the plurality of groups to the respective representative speaker of the other groups further comprises:

receiving the audio data from the devices in one group;

identifying a spectrum of the received audio data;

in response to there being audio data with a repetitive spectrum, removing the audio data with the repetitive spectrum;

composing the audio data without the repetitive spectrum as output audio data for the group; and forwarding the output audio data to the representative speaker of the other groups.

6. The method of claim 1, wherein the forwarding of the audio data received from the devices in one of the plurality of groups to the respective representative speaker of the other groups further comprises:

receiving the audio data from the devices in one group;

detecting whether there is a signal of a flag together with the received audio data;

in response to detecting there is no signal of the flag, adding the signal of the flag to the received audio data;

forwarding the received audio data with the signal of the flag to the representative speaker of the other groups; and in response to detecting there is the signal of the flag, removing the received audio data.

7. A computer-implemented system, comprising:

at least one processing unit; and a memory coupled to the at least one processing unit and storing instructions thereon, the instructions, when executed by the at least one processing unit, performing actions comprising:

in response to an update of devices of participants in an online conference, dividing the devices in the online conference into a plurality of groups and selecting at least one speaker of the devices in each of the plurality of groups as a representative speaker for each of the plurality of groups, wherein the devices located in a same physical location are divided into a same group, wherein the selecting at least one speaker of the devices in each of the plurality of groups further comprises:

identifying an intensity of the audio data received from the devices in each group;

estimating relative distances between each participant and any other participant in each group based on the intensity;

obtaining a volume percentage of the speaker of each device;

calculating a weight for each speaker in the group based on the volume percentage of the speaker and the relative distances; and selecting at least one speaker with a largest weight as the representative speaker for respective groups; and forwarding audio data received from the devices in one of the plurality of groups to the respective representative speaker of other groups of the plurality of groups.

8. The computer-implemented system of claim 7, wherein the dividing the participants devices in the online conference into a plurality of groups comprising:

checking whether there are devices which are neighbors to each other;

in response to there being devices which are neighbors to each other, including the devices which are neighbors to each other into a group; and in response to there being one or more devices which are not included in the group, including each of the one or more devices into an individual group.

9. The computer-implemented system of claim 8, further comprising:

in response to receiving the audio data from each of the devices, obtaining a spectrum of the audio data for each device;
in response to there being two or more kinds of spectrums within a group, splitting the group into two or more groups correspondingly, each group having the same spectrum; and
in response to there being groups having the same spectrum, combining the groups into one group.

10. The computer-implemented system of claim 7, wherein the dividing of the devices in the online conference into the plurality of groups further comprises:
in response to receiving the audio data from each of the devices, obtaining a spectrum of the audio data for each device; and
including one or more devices with the same spectrum into one group.

11. The computer-implemented system of claim 7, wherein the forwarding of audio data received from the devices in one of the plurality of groups to the respective representative speaker of the other groups further comprises:
receiving the audio data from the devices in one group;
identifying a spectrum of the received audio data;
in response to there being audio data with a repetitive spectrum, removing the audio data with the repetitive spectrum;
composing the audio data without the repetitive spectrum as output audio data for the group; and
forwarding the output audio data to the representative speaker of the other groups.

12. The computer-implemented system of claim 7, wherein the forwarding of the audio data received from the devices in one of the plurality of groups to the respective representative speaker of the other groups further comprises:
receiving the audio data from the devices in one group;
detecting whether there is a signal of a flag together with the received audio data;
in response to detecting there is no signal of the flag, adding the signal of the flag to the received audio data;
forwarding the received audio data with the signal of the flag to the representative speaker of the other groups; and
in response to detecting there is the signal of the flag, removing the received audio data.

13. A computer program product, the computer program product comprising a computer readable storage medium having program instructions embodied therewith, the program instructions executable by an electronic device to cause the electronic device to perform actions comprising:
in response to an update of devices of participants in an online conference, dividing the devices in the online conference into a plurality of groups and selecting at least one speaker of the devices in each of the plurality of groups as a representative speaker for each of the plurality of groups, wherein the devices located in a same physical location are divided into a same group, wherein the selecting at least one speaker of the devices in each of the plurality of groups further comprises:
identifying an intensity of the audio data received from the devices in each group;
estimating relative distances between each participant and any other participant in each group based on the intensity;
obtaining a volume percentage of the speaker of each device;
calculating a weight for each speaker in the group based on the volume percentage of the speaker and the relative distances; and
selecting at least one speaker with a largest weight as the representative speaker for respective groups; and
forwarding audio data received from the devices in one of the plurality of groups to the respective representative speaker of other groups of the plurality of groups.

14. The computer program product of claim 13, wherein the dividing of the devices in the online conference into the plurality of groups further comprises:
checking whether there are devices which are neighbors to each other;
in response to there being devices which are neighbors to each other, including the devices which are neighbors to each other into a group; and
in response to there being one or more devices which are not included in the group, including each of the one or more devices into an individual group.

15. The computer program product of claim 13, further comprising:
in response to receiving the audio data from each of the devices, obtaining a spectrum of the audio data for each device;
in response to there being two or more kinds of spectrums within a group, splitting the group into two or more groups correspondingly, each group having the same spectrum; and
in response to there being groups having the same spectrum, combining the groups into one group.

16. The computer program product of claim 13, wherein the forwarding of audio data received from the devices in one of the plurality of groups to the respective representative speaker of the other groups further comprises:
receiving the audio data from the devices in one group;
identifying a spectrum of the received audio data;
in response to there being audio data with a repetitive spectrum, removing the audio data with the repetitive spectrum;
composing the audio data without the repetitive spectrum as output audio data for the group; and
forwarding the output audio data to the representative speaker of the other groups.

17. The computer program product of claim 13, wherein the forwarding of the audio data received from the devices in one of the plurality of groups to the respective representative speaker of the other groups further comprises:
receiving the audio data from the devices in one group;
detecting whether there is a signal of a flag together with the received audio data;
in response to detecting there is no signal of the flag, adding the signal of the flag to the received audio data;
forwarding the received audio data with the signal of the flag to the representative speaker of the other groups; and
in response to detecting there is the signal of the flag, removing the received audio data.

\* \* \* \* \*